(12) United States Patent
Perschk

(10) Patent No.: US 10,474,919 B2
(45) Date of Patent: Nov. 12, 2019

(54) METHOD FOR DETERMINING AND DISPLAYING PRODUCTS ON AN ELECTRONIC DISPLAY DEVICE

(71) Applicant: Patty's GmbH, Hamburg (DE)

(72) Inventor: Andreas Perschk, Hamburg (DE)

(73) Assignee: Patty's GmbH, Hamburg (DE)

( * ) Notice: Subject to any disclaimer, the term of this patent is extended or adjusted under 35 U.S.C. 154(b) by 0 days.

(21) Appl. No.: 15/488,635

(22) Filed: Apr. 17, 2017

(65) Prior Publication Data

US 2017/0300768 A1 Oct. 19, 2017

(30) Foreign Application Priority Data

| Apr. 19, 2016 | (DE) | 10 2016 107 200 |
| May 27, 2016 | (DE) | 10 2016 109 838 |
| Dec. 2, 2016 | (DE) | 10 2016 123 308 |
| Dec. 13, 2016 | (DE) | 10 2016 124 277 |

(51) Int. Cl.
| G06K 9/00 | (2006.01) |
| G06K 9/20 | (2006.01) |
| G06K 9/34 | (2006.01) |
| G06K 9/62 | (2006.01) |
| G06Q 30/02 | (2012.01) |
| G06Q 30/06 | (2012.01) |

(52) U.S. Cl.
CPC ....... *G06K 9/2081* (2013.01); *G06K 9/00288* (2013.01); *G06K 9/00671* (2013.01); *G06K 9/2063* (2013.01); *G06K 9/34* (2013.01); *G06K 9/6202* (2013.01); *G06K 9/6215* (2013.01); *G06Q 30/0253* (2013.01); *G06Q 30/0643* (2013.01)

(58) Field of Classification Search
CPC combination set(s) only.
See application file for complete search history.

(56) References Cited

U.S. PATENT DOCUMENTS

| 9,152,624 | B1* | 10/2015 | Krallman | G06F 17/30 |
| 9,483,793 | B1* | 11/2016 | Varadhan | G06Q 30/0643 |
| 2012/0294520 | A1 | 11/2012 | Mei et al. | |
| 2013/0007620 | A1 | 1/2013 | Barsook et al. | |
| 2013/0132236 | A1 | 5/2013 | Gokturk et al. | |
| 2013/0282712 | A1 | 10/2013 | Brandt | |
| 2014/0249957 | A1* | 9/2014 | Saha | G06Q 30/0613 705/26.41 |
| 2014/0267439 | A1 | 9/2014 | Jenkins | |

(Continued)

*Primary Examiner* — Jerome Grant, II
(74) *Attorney, Agent, or Firm* — Howson & Howson LLP

(57) ABSTRACT

A method for finding and displaying products on a display device of an electronic data processing device is provided. The method includes recognizing an image or image section with at least one imaged object displayed on the display device when the cursor of the data processing device moves into an area of the image or image section. The recognized image or image section is designated with a trigger when the cursor of the data processing device moves into the area of the image or image section and the trigger is superimposed on the area of the recognized image or image section on the display device. The displayed image is segmented and at least one object is detected by an analysis of visual content of the designated image or image section by actuating the superimposed trigger. The at least one detected object may be displayed on the display device.

16 Claims, 1 Drawing Sheet

(56) References Cited

U.S. PATENT DOCUMENTS

| | | | |
|---|---|---|---|
| 2014/0359507 A1* | 12/2014 | Kim | G06F 3/04886 |
| | | | 715/769 |
| 2015/0026642 A1 | 1/2015 | Wilson et al. | |
| 2015/0134688 A1 | 5/2015 | Jing et al. | |
| 2017/0024792 A1 | 1/2017 | Perschk et al. | |
| 2017/0206417 A1* | 7/2017 | Aoyama | G06K 9/00671 |
| 2017/0269682 A1* | 9/2017 | Shigeta | G06F 3/0488 |
| 2018/0012151 A1* | 1/2018 | Wang | G06Q 10/0639 |
| 2018/0068292 A1* | 3/2018 | Naitou | G06K 7/10722 |
| 2018/0075214 A1* | 3/2018 | Minemura | G06F 3/0482 |
| 2018/0085665 A1* | 3/2018 | Walls | A63F 13/27 |

* cited by examiner

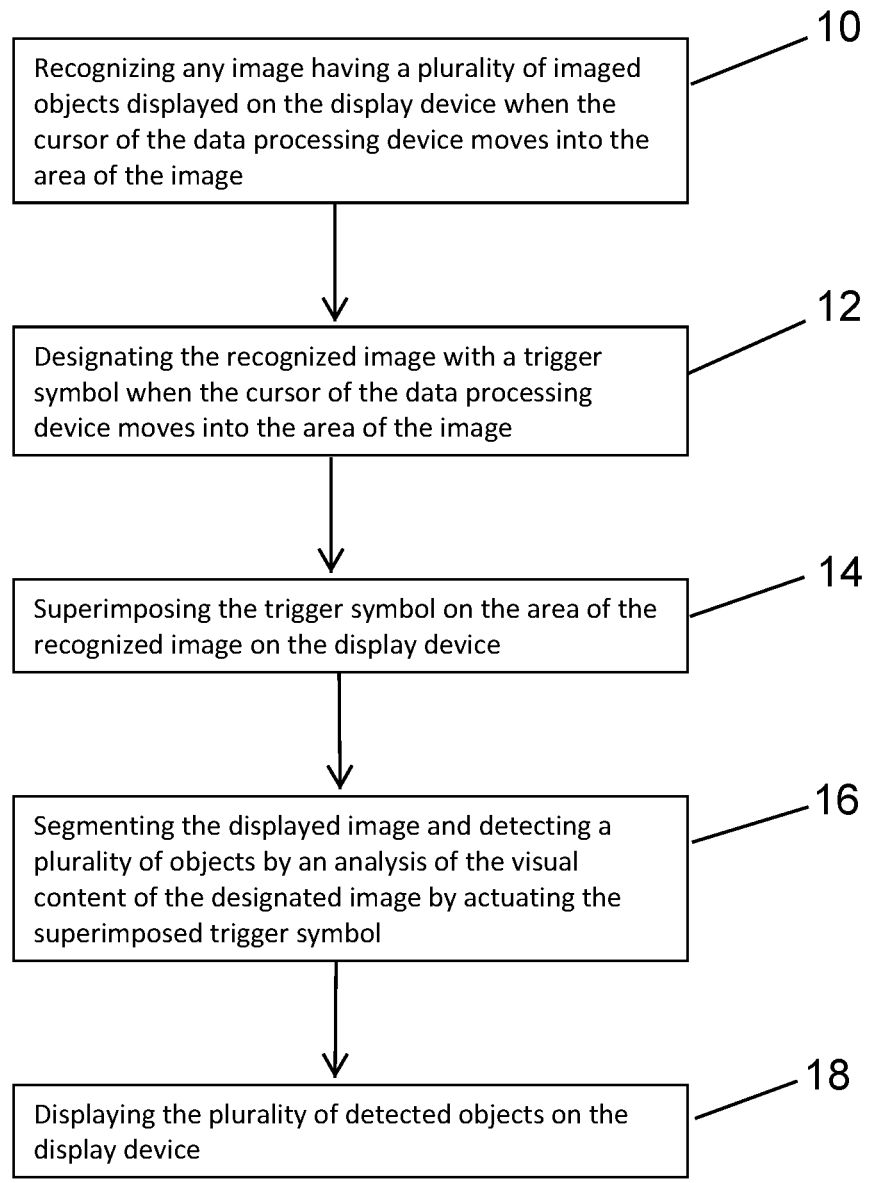

METHOD FOR DETERMINING AND DISPLAYING PRODUCTS ON AN ELECTRONIC DISPLAY DEVICE

BACKGROUND

The invention relates to a method for finding and displaying products on a display device of an electronic data processing device.

It is frequently desirable to identify certain objects or items inside displayed images so that these objects can be purchased. A plurality of images is present on the World Wide Web (Internet) which displays certain products or other things without there being the possibility of obtaining more information about the product or the image. It is known that links to certain web pages are contained for the image. However, they only lead to already given web pages.

It would also be desirable to process any products for which there are images or by which images are generated and to recognize the products reproduced on them in order that a corresponding offer or other offers can be displayed.

BRIEF DESCRIPTION OF THE DRAWING

The FIGURE is flowchart of a method according to an embodiment.

DETAILED DESCRIPTION

The invention has the problem of developing a method for displaying products or their reference sources in such a manner that the objects present on an image are recognized are displayed.

The problem is solved according to the invention by a method with the following steps:
 Recognizing an image or image section with at least one imaged object displayed on the display device when the cursor of the data processing device moves into the area of the image or image section,
 Designate the recognized image or image section with a trigger when the cursor of the data processing device moves into the area of the image or image section,
 Superimpose the trigger on the area of the recognized image or image section on the display device,
 Segmentation of the displayed image in the direction of the at least one object by an analysis of the visual content of the designated image or image section by actuating the superimposed trigger,
 Displaying the at least one detected object on the display device.

If the image to be investigated does not appear on the display device, for example, during surfing on the Internet, it is also possible to make an image of a product in the real environment with a camera and to display this image on the display device. This generated image can subsequently be appropriately processed. However, it can also be advantageous if the image made in the real environment is directly transmitted to a bot of a data processing system which then carries out the further steps.

It is therefore provided that in a method for finding and displaying objects such as products, services or websites on a display device of an electronic data processing device, the following steps are carried out:
 Generation of an image of at least one object which can be transmitted with an electronic data processing device,
 Sending the image to a bot of an electronic data processing system,
 Segmentation of the transmitted image and detection of the at least one object by an analysis of the visual content of the transmitted image or image section, and
 Optionally displaying the at least one detected object on the display device.

The transmitted image can comprise either only one object or a plurality of objects. It is also possible to make only a sketch of an object and to transmit it. Also, only or additionally a search word for a product to be searched for can be transmitted. In the following, such a self-made image or drawing can be equated with an image appearing on the display device since the further processing takes place in substantially the same manner.

Also, the display of the detected object could basically be eliminated since it is only required for the identification. Nevertheless, the display of this detected object is useful as a support for the thinking of the user.

The cursor, with which the user selects certain image sections or the like on the display device, can be designed as desired. Therefore, the "mouse" arrow, which is moved with the mouse, can be the cursor, or it can be a speech control or, however, also the direction of the user's view, which is recognized by the data processing system and evaluated. The carrying out of the method can take place and be started by activating the cursor, for example, by "clicking" On.

The product to be found can be an item or a service or even a person. It is only required that this product can be represented, so that it can be displayed on a display device.

Afterwards, the visual content of the displayed image is analyzed in the method. An independent image processing of the displayed image or image section takes place in order that the displayed objects are separated and separately displayed. It is also possible that the displayed image is recognized as a previously known image. It is also possible that a description hanging on this image and which is adjacent to the image is processed in order to raise the certainty of the similarity analysis. If the image shows, for example, a bicycle with a bicycle rider in the forest, the description appended to the image file can contain the keyword "bicycle" among other things. The search can then take place in a reliable manner for similar bicycles.

Certain addresses are associated with a previously known image which make possible a later association with the originator and other persons or companies. Therefore, the original image can be found by the analysis of only the displayed image independently of its background data (so-called links or tags). Finally the image to be analyzed can also be a photograph shown on the display device. In addition, the method allows classifying metadata or background data to be associated with each investigated or analyzed image. This makes it possible to find the identical image. On the other hand, the similarity analysis can be carried out more rapidly.

After the analysis the identical image with corresponding references to the products and web pages shown there is displayed to the user. He is therefore capable of ordering the products concerned. The invention therefore provides that a product to be selected is selected from the displayed objects and that an image analysis of the selected product is carried out and a feature profile is prepared by an electronic image processing, that the product identical to the product to be selected is determined by a comparison of the prepared feature profile with previously determined and stored feature profiles of other objects, and that the found, identical product is displayed with other information about the product on the display device.

It is furthermore also provided that a product to be selected is selected from the displayed objects, and that products similar to the product to be selected are determined by a comparison of the prepared feature profile with the previously determined and stored feature profiles of other objects and are displayed on the display device adjacent to or instead of the identical product. This means that not only the identical products but also other products are displayed which are similar. The user therefore obtains a selection of similar products which might please him better and which he can also acquire since the reference sources or other information is/are appended and displayed for these similar and displayed products.

It is also possible that a product to be selected is selected from the displayed objects, and that products similar to the product to be selected are determined and are displayed adjacent to or instead of the identical product on the display device. An expanded offer is displayed here which also contains other products in addition to the actually desired product, which other products are similar to the desired product, or shows complementary products which supplement the desired product and expand the totality of products.

It is in particular possible that a product to be selected is selected from the displayed objects, and that products which were previously freely associated with the product to be selected are determined and displayed adjacent to or instead of the identical product on the display device. It is also possible that products which were previously freely associated with the found, identical product are determined and displayed adjacent to or instead of the identical product on the display device. This makes it possible that other products are displayed on the basis of a recognized product because the seller or the producer of the product or a blogger would like it so. This can increase the turnover.

Not only the actual images are checked here, but also, those which were placed in other economic systems in the World Wide Web or with foreign competitors. The images are known by their addresses. Accordingly, reference is made to the locations concerned and the appropriate image is displayed.

The above-cited steps can be continuously repeated in that the user selects a displayed product with the operating device or the cursor. The selected and displayed product is then taken as the starting point for the similarity analysis. However, the metadata for this product is already present so that these following steps can take place very precisely and rapidly. It is advantageous here if at least the first-sought image and the optionally subsequently selected products are displayed on the display device. The user can then better control or monitor his search.

This makes it possible that the user continuously works his way through the found and displayed products until he hits upon his desired product or another product. He does not need to input any other information but rather the selection takes place only by a mere observing and subsequent selection of the image. The similarity analysis is performed is repeated every time an image or product is selected but with the last-selected image as the starting image. The user therefore approaches the final desired product step-by-step.

The image analysis takes place in particular on the basis of the visual information shown in the image. To this end, it can be provided that the shown image is analyzed and that the individual objects found in this manner are identified. These objects are coded and compared with previously coded objects whose origin is known in the specific or in a foreign economic system. In the case of a coincidence or at least of a similarity the objects found in this manner are displayed.

It is possible to proceed here in such a manner that as many image files as possible are analyzed and classified in the background. This metadata produced in this manner is filed with the reference data or original data on a server so that a search in a large and constantly increasing plurality of images is rapidly possible. The consideration of an image takes place by the image analysis.

It can also be provided that the displayed image had been previously filed on a server. It is then immaterial where this image appears again in the World Wide Web since it or the originator or the user can be immediately found by the similarity analysis. Other information can also be suspended on the previously filed image and which should show when this image was sought for.

It is possible by these measures to allow certain settling processes. The originator of the image or the entitled user of the image is unambiguously recognized and any payments provided for the items or objects displayed on the image can be calculated. As a result, a settling process in affiliated procedures is possible solely based on images and their referencing.

It is provided here that the origin of the image displayed on the display device and to be analyzed is not known and also does not have to be known. Rather, the displayed image is viewed and analyzed only by the data processing system. A coding of the visual content takes place by means of which codings of other images are sought in the available codings and in codings filed in a databank. In the case of a sufficient coincidence the image associated with the coding determined in this manner is displayed.

The coding of the previously analyzed images takes place in the background either by a continuous observation of images in the World Wide Web. It is also possible that an image is actively transmitted to the databank for analysis. A free association of products to be displayed in the display of this one image is then possible. In particular, the originator of the image can be determined.

Nowadays, frequently so-called bloggers advertise in the World Wide Web for certain products in that the blogger shows these products in a natural environment or use. The blogger has a plurality of so-called followers which like the products shown by the blogger and may want to purchase them. The blogger puts an image of himself and/or of the product on the Internet. This image is widely spread in the World Wide Web. The user sees the image and might actually like to purchase this product. He recognizes by the superimposed trigger of the invention that this image can be analyzed and starts the process.

On the one hand, the identical image is found since it was communicated, for example, previously by the blogger to the databank. Then, a display of the products displayed on it with their reference source takes place because the blogger set this in this manner when he filed it. Then, a display of identical, similar or suitable objects takes place which were found independently thereof by the image analysis. The user can therefore simply select whether he would actually like to purchase the identical product in the reference source displayed there or a similar product in another reference source.

Furthermore, the invention provides that the object is a person, that the face of the person is recognized and classified by the image analysis, that other images with the person are determined using the classification features prepared in this manner, and that the images determined are displayed on the display device. The person is in particular a female blogger or a male blogger who frequently added data for the products acquired by him or her to his images. This data can be displayed directly adjacent to the image concerned.

However, this parallel display is frequently not possible on a display device for reasons of space. It is therefore furthermore provided that by corroborating the trigger in an image found in this manner with the female blogger or the male blogger at first the products and their reference source associated therewith are displayed. It can also be provided that the above-explained image analysis is carried out by corroborating the trigger. The products attached by the female blogger or the blogger and also optionally be displayed in the first place.

It can also be advantageous if the display of the images found based on the spatial recognition are sorted and especially if the sorting takes place after the preparation date or the insertion date into the World Wide Web. The most recent image is displayed in the first place so that the user can rapidly find the most current image of the person concerned. This is in particular advantageous if the images are added without a connection and without a common finding location in the World Wide Web. The user therefore obtains a history of the images added by his or her favorite blogger and can act in an appropriate manner, for example, purchase a new product being offered by the blogger.

The images with the desired products and/or the person concerned and his similar products and/or images with the person concerned are determined only using the prepared image analysis of an image which is visible in the World Wide Web. Therefore, additions can be made at any location in the World Wide Web and also in foreign economic systems of the World Wide Web without other references.

It is possible with the suggested method to rapidly and reliably find a large offer of products in the entire World Wide Web. The user only needs to choose an appropriate image with this product on the display device. The data processing program which carries out the method must be previously be installed on its data processing device or be accessible so that it recognizes the image and can carry out the image analysis. The program runs continuously at the same time so that, for example, when observing an image by superimposing the trigger in the image it is pointed out to the user that this image is ready for an analysis.

The program does not start with the image analysis and show other products or services and their reference sources until by the active selection of this trigger. Also, persons can be displayed on the image with their contact addresses or presences on social platforms. The user moves comfortably from one product to the next one and can then select his desired product while taking his time. The purchase of the product can then take place in a known manner at the reference source which is then displayed.

The user no longer has to input any search concept. Rather, he is addressed by an image and can purchase a product shown on it. The selection process begins by actuating the superimposed trigger. The user is quickly and comfortably guided through the entire offer in the World Wide Web by multiply "clicking", that is, selecting one of the displayed products until he arrives at a product which he would actually like to purchase, view or use.

Several offers are made to the user which he can accept or not by the possibility of also displaying suitable or complementary products in addition to similar products. Even entirely different products can be displayed which, however, are frequently purchased with the originally selected product. Therefore, several suggestions are made to the user. However, they do not take place arbitrarily but rather based on his own selection.

This type of image processing also makes it possible to make other links in the World Wide Web. It is possible, for example, that a face, a person, a position of a person, or a gesture of a person is recognized and associated with certain links to other programs, websites, services or products. Instead of the image of a real person or of a real product even pictographs or ideograms, so-called emojis can form the basis for these linkages.

It can also be provided that such already given pictographs or emojis or other imaged or recorded gestures are transmitted to the bot of the data processing system, for example, by a smart phone or hand-held computer. These transmitted images of emojis, gestures or persons are linked with the freely given action, for example, with an advertising offer or with restaurant addresses in the vicinity and are returned to the sender or to a web address or email address given by him. The particular action linked to an emoji or to a gesture can change with the passage of time.

The image processing used also makes possible the recognition of faces or persons in self-made images. It can then be provided that an image taken of a person is recognized and that this person is identified. It is then possible to link certain actions or websites with the image made of him based on the recognized person. Therefore, for example, a known model can be recognized and certain websites of companies are referred to which have this model under contract.

However, it is therefore also possible to bring about a contact photograph of the image sender with the imaged person in that the image of the particular recorded person is analyzed and the person is recognized. Then, a message, preferably with the made image and optionally with a greeting or a contact address or telephone number, is linked to it and sent preferably to a non-published web address. The imaged person can then decide whether he would like to make the contact.

Furthermore, it is possible to connect certain images with each other in order to obtain a new statement, so that a predetermined linkage is established using this statement which is then recognized. Thus, for example, the emoji "thumbs up" together with a product can mean that the product should be available soon and within a circle which can be determined in advance. The search can then refer not only to the product itself but also to sellers of the product or of similar products within the predetermined radius of action so that the user can rapidly acquire the desired product.

It can also be provided that the status of a person is recognized on the analyzed image and is then linked to suitable offers. If, for example, a rather old person is shown on the image, this is then recognized as an "old" status and offers about old folks homes or a style suitable for elderly persons are displayed.

Another embodiment of the invention provides that a recognized object (product, person, face, pictograph) is linked to an image with other programs. Thus, a female blogger recognized on an image can lead when executing the program to the possibly unknown blog of this female blogger.

Furthermore, it is possible to recognize certain activities which can be seen on the image. If, for example, a bicycle rider or a bicycle is recognized, the method according to the invention makes a linkage to certain bicycle clubs or bicycle companies. In addition, it can be provided that the location of the user is known or is determined and that such associations take place only in a circle which can be determined in advance. As a result, the offers can be gotten and are immediately perceived by the user.

These linkages are freely selectable by the program so that they can be followed on the one hand and also be paid. In this case the superimposed figure leads to some other program or to any website, to a freely selected product, to freely associated services or the like. These linkages are given by the program and can also change on a running basis, for example, depending on the time of day or the time of year or only for a time that can be determined in advance. Thus, short-term offers or advertisements or the like can always be displayed for the valid time period when the product or a similar product, an activity or a service is displayed on an image.

The invention was described above in connection with the World Wide Web. It is of course also possible to process smaller networks and in particular intranetworks in such a manner.

EXAMPLE

The invention is described in detail in the following using an example.

A known person on a bicycle with a hat and a bag is shown on a displayed image. The person is wearing pants and a shirt and sport shoes. This person is a known female blogger. The user is a follower of this female blogger and looks at her images in the World Wide Web. When looking at the image the user likes the bicycle but also the shoes of the female blogger and would like to purchase these shoes.

The user can execute the program of the invention on his data processing system. As soon as the cursor of his data processing system moves over the image, the program recognizes an image that can be processed and superimposes the trigger, for example, a green point, in the lower right corner of the image, or in the area of the "mouse" indicator. See steps 10, 12 and 14 of the FIGURE. The user then knows that this image can be processed and that the products to be seen on it can be segmented and separately displayed.

At first, a check is made whether the image is identically known by actuating the trigger. Then, the image, the female blogger, the bicycle, the hat, the bag, the pants and the shirt are separately displayed on the display device. It can be provided here that the products to be displayed were given by the female blogger herself. Then, only products of certain producers and their reference source are displayed.

If the image had not been previously filed, an analysis and a segmentation of the image takes place. See step 16 of the FIGURE. The recognized products, namely, a bicycle, a hat, a bag, a pair of pants, shoes and a shirt are separately displayed. See step 18 of the FIGURE. They can be similar to the originally shown products or can also be identical. Furthermore, however, even the watch of the female blogger and the background of the image are also displayed since they were recognized by the image processing. This analysis can also take place additionally or alternatively for known images.

The user selects the displayed shoes. In addition to the original image, the selected shoes and other similar shoes as well as their reference sources are displayed. Furthermore, even products which are appropriate for the shoes such as shoe care agents, shoelaces or shoe racks are displayed. It is also possible that in addition to the shoes other associated products, for example, foot care products or purses which match in color are displayed. The user finds himself in a virtual department store in which all possible products can be displayed for him which have any fixed or freely associated connection to his original desired product.

The user now selects a product that pleases him especially well from these displayed products. He can then purchase this product in the customary manner. Furthermore, the product appears next to the original image and to the first-selected product.

The user remembers that he also liked the bicycle. He returns to the original images and subsequently selects the determined bicycle. The identical bicycle with this reference source is displayed as well as other similar bicycles. Here too, the user can rapidly and conveniently make an order for a bicycle which he desires.

The selection of products by the user takes place only by using the visual representation. No inputs need to be made. The available products are immediately displayed to the user with their reference sources so that finding them and, for example, purchasing them is possible in a rapid and purposeful manner. Finally, the one-time actuation, for example the "clicking" with the computer mouse is sufficient for carrying out the search in a purposeful and segmented manner in the very large number of products which are shown in the World Wide Web. The user will orient himself using the visual appearance and will select a product according to his taste. As soon as the desired product has been found, he can actuate the purchase or acquisition or the order.

Not only the identical, but also similar products, are displayed so that the original image can also be taken only as a stimulation. The user receives not only information about the identical product but also about similar products that might please him better. Therefore, the purchase becomes an experience for the user since he can rapidly move from one product to the next one. The user does not have to actuate the purchase in the reference source which is then displayed until at the end of his search.

The search takes place continuously based on the last-selected image so that the accuracy constantly increases. Since the actively selected products can always be displayed in the form of an image history, the user can also jump back and continue his search for another product displayed on the image. Furthermore, identical images or products which were found during the search can be recognized as such and only one of them displayed which shows, for example, the most economical product.

It is also possible that the user selects a certain image section in the image with a product which interests him and sends only this image section to the image analysis. The image analysis can take place in his own or also in other economic systems. This can limit and accelerate the search. This possibility of the selection of image sections can be displayed by a frame in the originally selected image. The further selection process takes place as described above.

I claim:
1. A method for finding and displaying products on a display device of an electronic data processing device, comprising the steps of:
　recognizing any image or image section having a plurality of imaged objects displayed on the display device when a cursor of the data processing device moves into an area of the image or image section;
　designating the recognized image or image section with a trigger symbol when the cursor of the data processing device moves into the area of the image or image section;

superimposing the trigger symbol on the area of the recognized image or image section on the display device;

segmenting the displayed image and detecting a plurality of objects by an analysis of the visual content of the designated image or image section by actuating the superimposed trigger symbol; and displaying the plurality of detected objects on the display device;

wherein a product to be selected is selected from the displayed objects and that an image analysis of the product is carried out and a feature profile is prepared by electronic image processing, that subsequently a product identical to the selected product is determined by a comparison of the prepared feature profile with previously determined and stored or previously known feature profiles of other objects, and that the found, identical product is displayed with other information about the product on the display device; and wherein products similar to the product to be selected are determined by a comparison of the prepared feature profile with the previously determined and stored or previously known feature profiles of other objects and are displayed on the display device adjacent to or instead of the identical product.

2. The method according to claim 1, wherein objects, products, services or websites suitable for the product to be selected are determined and are displayed on the display device adjacent to or instead of the identical product.

3. The method according to claim 1, wherein objects, products, services or websites previously freely associated with the product to be selected are determined and are displayed on the display device adjacent to or instead of the identical product.

4. The method according to claim 1, wherein objects, products, services or web sites previously freely associated with the found, identical product are determined and displayed on the display device adjacent to or instead of the identical product.

5. The method according to claim 1, wherein a number of the displayed products is selected in such a manner that a simultaneous display of these products as well as of the product to be selected takes place on the display device.

6. The method according to claim 1, wherein, during the selection of one of the determined products, other product offers are displayed which are similar to the displayed product.

7. The method according to claim 1, wherein the selected product and/or the recognized image or the recognized image section is stored and/or remains constantly displayed.

8. The method according to claim 1, wherein the prepared feature profile of the selected product is stored.

9. The method according to claim 1, wherein the trigger symbol remains superimposed in the recognized image or image section until the cursor leaves the image or the image section.

10. The method according to claim 1, wherein the image or the image section or objects on them are recognized by the data processing device or are defined by the user.

11. The method according to claim 1, wherein the image analysis and the displaying of products is carried out by a one-time actuation of the cursor.

12. The method according to claim 1, wherein the object is a person, that the face of the person is recognized and classified by the image analysis, that other images with the person are determined using the classification features prepared in this manner, and that the images determined are displayed on the display device.

13. The method according to claim 12, wherein, by corroborating the trigger in an image found in this manner with the person, the products and their reference source associated with them are displayed.

14. The method according to claim 1, wherein the display of the images found are sorted and the sorting takes place after the preparation date or the insertion date into the World Wide Web.

15. A method for finding and displaying objects such as products, services or web sites on a display device of an electronic data processing device, comprising the steps of:

generating an image of at least one object which can be transmitted with an electronic data processing device;

sending the image to a bot of an electronic data processing system;

segmenting the transmitted image and detecting at least one object by an analysis of the visual content of the transmitted image or image section; and displaying the at least one detected object on the display device;

wherein a product to be selected is selected from the displayed objects and that an image analysis of the product is carried out and a feature profile is prepared by electronic image processing, that subsequently a product identical to the selected product is determined by a comparison of the prepared feature profile with previously determined and stored or previously known feature profiles of other objects, and that the found, identical product is displayed with other information about the product on the display device; and wherein products similar to the product to be selected are determined by a comparison of the prepared feature profile with the previously determined and stored or previously known feature profiles of other objects and are displayed on the display device adjacent to or instead of the identical product.

16. The method according to claim 15, wherein objects, products, services or websites suitable for the product to be selected are determined and are displayed on the display device adjacent to or instead of the identical product.

* * * * *